United States Patent [19]
Spiess et al.

[11] Patent Number: 5,890,515
[45] Date of Patent: Apr. 6, 1999

[54] FLOW CONTROL VALVE WITH A FLOW METER

[75] Inventors: Fritz Spiess, Unterlunkhofen; Stefan Muntwyler, Spreitenbach, both of Switzerland

[73] Assignee: Ostaco, AG, Urdorf, Switzerland

[21] Appl. No.: 815,334

[22] Filed: Mar. 10, 1997

[30] Foreign Application Priority Data

Mar. 18, 1996 [CH] Switzerland ............................ 706/96

[51] Int. Cl.⁶ .................................................. F16K 37/00
[52] U.S. Cl. .................... 137/552; 137/556.3; 137/559; 116/273; 116/285; 73/861.74
[58] Field of Search ................. 137/552, 556.3, 137/556.6, 559; 116/64, 273, 285; 73/861.71, 861.74

[56] References Cited

U.S. PATENT DOCUMENTS

| | | | |
|---|---|---|---|
| 715,108 | 12/1902 | Meredith | 137/556.6 |
| 932,960 | 8/1909 | Cappon | 137/556.6 |
| 1,168,957 | 1/1916 | Nessa | 116/273 X |
| 1,665,141 | 4/1928 | Mayer | 73/861.72 |
| 2,293,473 | 8/1942 | Schlueter | 73/861.71 |
| 2,827,008 | 3/1958 | Hodge | 116/273 |
| 3,051,805 | 8/1962 | Binford | 335/48 |
| 3,119,262 | 1/1964 | Wright et al. | 73/861.71 |
| 3,345,716 | 10/1967 | Wiebe et al. | 72/861.74 X |
| 3,545,616 | 12/1970 | Aspinwall et al. | 116/264 X |
| 3,744,313 | 7/1973 | Thompson | 73/861.54 |
| 3,881,354 | 5/1975 | Block | 73/861.71 |
| 5,560,392 | 10/1996 | Spang et al. | 137/552 |

FOREIGN PATENT DOCUMENTS

| | | |
|---|---|---|
| 2 361 633 | 3/1978 | France . |
| 28 03 261 | 8/1979 | Germany . |
| 31 06 523 | 11/1982 | Germany . |
| 31 28 710 | 2/1983 | Germany . |
| 35 09 718 | 9/1986 | Germany . |
| 57-113318 | 7/1982 | Japan . |
| 582991 | 12/1946 | United Kingdom ................... 116/273 |
| 2 036 333 | 6/1980 | United Kingdom . |

Primary Examiner—John Rivell
Attorney, Agent, or Firm—Welsh & Katz, Ltd.

[57] ABSTRACT

The height of the valve with a flow meter shall be as small as possible, enabling it to be mounted in restricted spaces. In order to achieve this, all adjusting and display movements are not executed axial but on the contrary polar. The rotating spindle of the valve is designed as rotary slide valve and the display marker or the graduation of the display unit of the flow rate meter is present on a rotating bush. The total height of the valve with a flow meter is accordingly low and unchangeable.

8 Claims, 2 Drawing Sheets

FLOW CONTROL VALVE WITH A FLOW METER

BACKGROUND OF THE INVENTION

1. Field of the Invention

The present invention relates to a flow control valve with a flow meter, with a housing having a conduit section, a transverse tube which extends perpendicularly to the conduit section, a rotating spindle arranged coaxially to the transverse tube and supported in the housing, which rotating spindle has a bore which is closed against the surroundings and extends through the spindle, a position control bar which projects into the bore and has a spring supporting area, a helical spring which is inserted between the spring supporting area and a spring support of the rotating spindle, which helical spring is adapted to determine an indicating position of the position display bar, a valve closure body adapted to be shut in an end position by means of the rotating spindle, a flow receiving member located in the transverse tube and biased by the helical spring into a home position and adapted to be axially displaceable by a flow occurring in the conduit section, which rotating spindle has a transparent portion, a position display unit including a graduation and a marker, so that a respective position of the flow receiving member displayed by the graduation and marker is readable from the outside through the transparent portion, which transverse tube projects radially into the conduit section and the rotating spindle and the valve closure body which valve closure body is adapted to directly open and close an outlet port of the transverse tube upon a rotating movement of the rotating spindle, which flow receiving member and which position control bar are guided in the valve closure body to be together axially displaceable.

2. Description of the Prior Art

A flow control valve with a flow meter of the kind mentioned above is disclosed in the DE-PS 35 09 718. This control valve occupies a rather large space when installed and the definition of its position display unit is limited.

SUMMARY OF THE INVENTION

Hence, it is a general object of the present invention to provide a flow control valve with a flow meter of which the structural length is reduced and at the same time an increased definition of the position display unit is arrived at, thus has a longer scale. A shorter structural length of the flow control valve with a flow meter, i.e. the length of the extent in the direction of the position display bar and also an increased definition of the position display unit are quite desirable in practical applications, because on the one hand the flow control valve with a flow meter can be used also in restricted spaces and on the other hand a reading of the measured flow rate is more precise and more easy.

A further object of the invention is to provide a flow control valve with a flow meter, in which the rotating spindle is designed as a rotary slide valve of which the valve closure body has a control edge which is rotatable and is arranged at the transverse tube, which transverse tube has a port in its wall of which the edge forms the valve seat, and in which the position display bar is guided against a rotation relative to the rotating spindle and is connected to a rotating bush in such a manner that an axial movement of the position display bar is converted into a rotary movement of the rotating bush, which rotating bush carries a part of the position display unit.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENT

Figure 1:
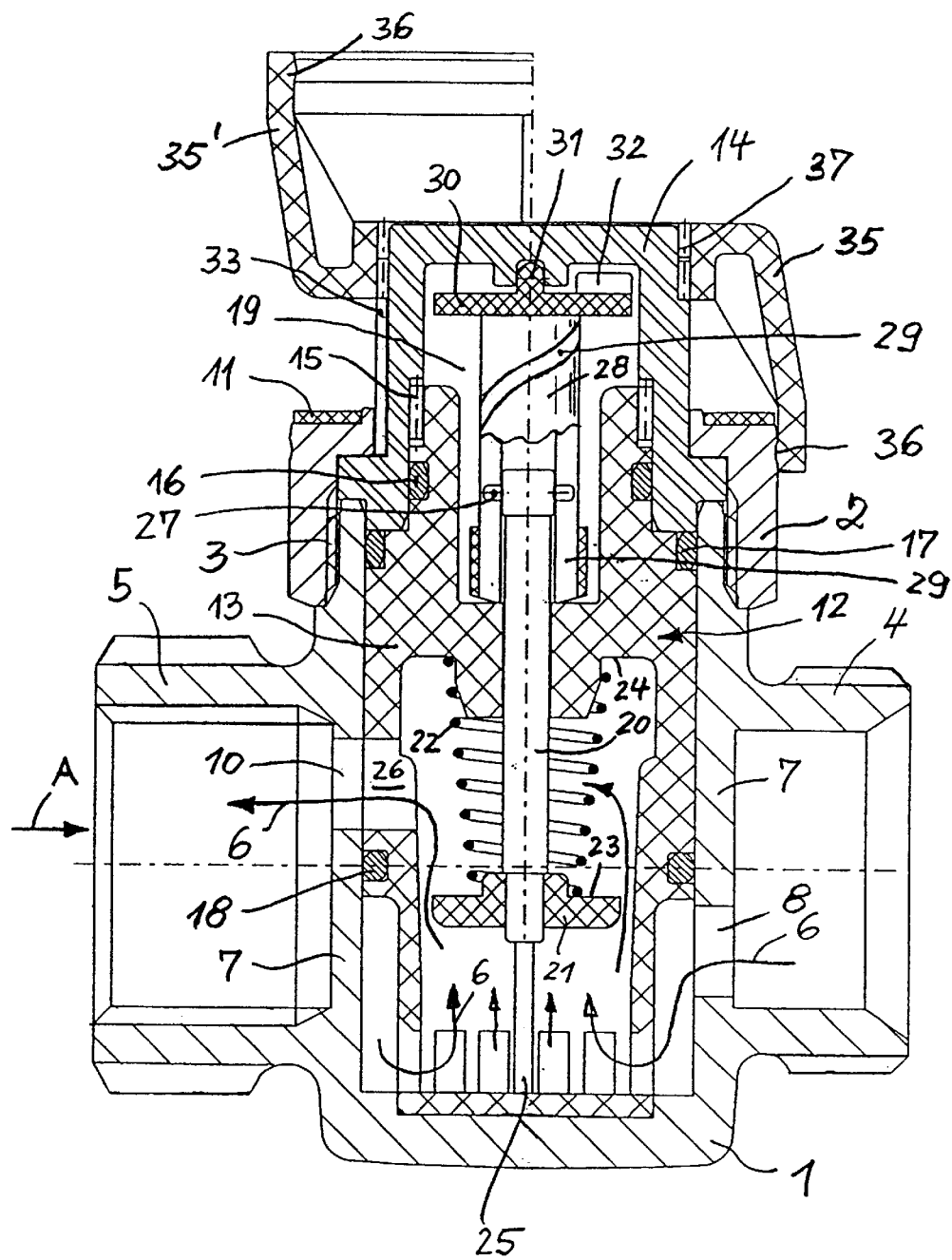
FIG. 1 is a longitudinal section through a flow control valve with a flow meter.

Below, the design of the valve will be explained. The housing includes the two housing parts 1 and 2 which are screwed together by a screw thread 3. The housing part 1 has an inlet stub 4 and an outlet stub 5. The flow through the housing proceeds in the direction of the arrows 6. Thus, the stubs 4, 5 form the conduit section of the housing. A transverse tube 7 extends radially to this conduit section, which transverse tube is a part of the housing. At the inlet side of the housing 1 to 5 the transverse tube 7 includes a port 8. At its outlet side the transverse tube 7 has a port 10 of which the edge 9 forms a valve seat. The housing part 2 with the thread 3 is designed as a cap screw which includes on a planar surface area a symbol carrier 11.

Now, the flow meter of the subject of the invention will be explained. A rotating spindle 12 is supported for rotation and in a sealed manner in the transverse tube 7. The rotating spindle 12 consists in turn of two parts and includes a in FIG. 1 crosshatched lower part 13 and an upper part 14 consisting of a transparent material. The two parts 13 and 14 are locked against rotation relative to each other by a form-locked connection, e.g. a serration 15. A sealing ring 16 seals between the two parts 13 and 14, and the rotating spindle 12 is sealed in the transverse tube 7 by two sealing rings 17 and 18. The rotating spindle 12 has a bore 19 which is closed off against the surroundings.

An axially displaceable position display bar 20 extends coaxially to the axis of the rotating spindle 12. A plate-like flow receiving member 21 is mounted to the bottom of the position display bar 20. It is located at a radial distance inside of the rotating spindle 12. A compression spring 22 is present, which spring 22 rests at one end against a spring supporting area 23 of the flow receiving member 21. At its opposite end the spring 22 rests against a spring support 24 of the rotating spindle 12. The position display bar 20 is guided in the rotating spindle 12 for an axial movement but against rotating therein. For this reason the inner circumferential surface of the rotating spindle 12 is equipped with two longitudinal ribs 25 (key) located diametrically opposite of each other, and which project into two not specifically illustrated recesses (slot) of the flow receiving member 21 arranged also diametrically opposite of each other, so that the flow receiving member 21 is guided by these ribs 25 against rotation but is axially displaceable. The crosshatched part 13 of the rotating spindle 12 illustrated in FIG. 1 consists e.g. of Teflon (PTFE).

Figure 2:
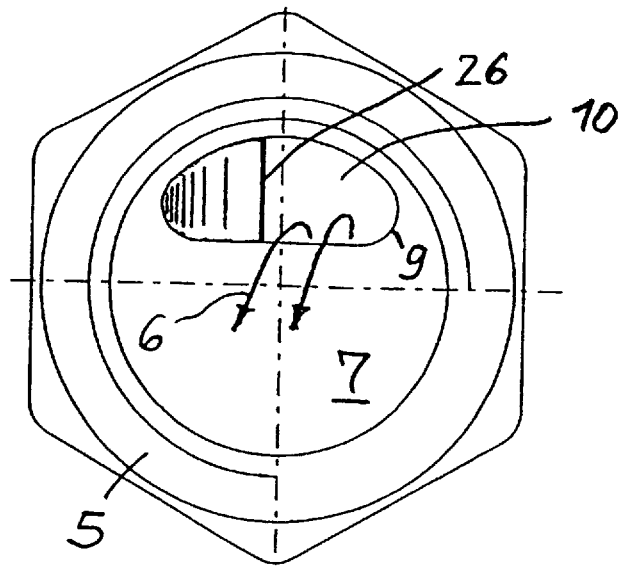
FIG. 2 is a side view of the outlet stub of the housing of the valve seen in the direction of the arrow A in FIG. 1.
Figure 3:
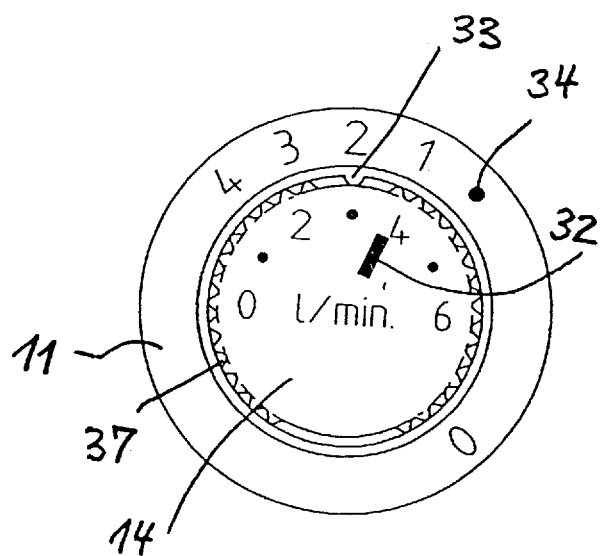
FIG. 3 is a top view of the flow control valve with a flow meter.

In order to solve the stated object the rotating spindle 12 is designed as a rotary slide valve of which the valve closure body includes a control edge 26 which cooperates with the valve seat 9 at the outlet stub 5 and accordingly controls the outlet aperture (FIG. 2). The position display bar 20 has at its upper end two sliding bars 27 located diametrically opposite of each other. The position display bar 20 is coupled for movement to a rotating bush 28 in such a manner that the axial movement of the position display bar 20 is converted into a rotary movement of the rotating bush 28. To this end the rotating bush 28 includes two helical sliding bar grooves 29, each receiving a displaceably guided sliding bar 27 therein. A plate 30 with a journal pin 31 is located on top of the rotating bush 28, and the parts 30, 31 can again consist of Teflon. The plate 30 carries a marker 32 which acts as pointer (FIG. 3). The transparent rotary slide valve part 14 carries on its planar surface area a graduation illustrated in FIG. 3, whereby the marker 32 indicates a flow rate of about 3.8 liters per minute. The rotary slide valve part 14 has additionally a second marker 33 on its surface which is structured as an axial notch and is located in FIG. 3 at the symbol "2" of the scale 11. The planar surface area of the rotating bush 28 which carries the marker 32, the uppermost located planar surface area of the transparent part 14 of the rotary slide valve and the planar surface area of the symbol carrier 11 extend parallel to each other.

Accordingly, two markers 32 and 33 and two graduations are visible in FIG. 3, whereby one is located on the rotary slide valve part 14 and the other graduation is located on the symbol carrier 11. The display unit 14, 32 indicates a flow rate through the valve in liters per minute. The other display unit 11, 33 indicates how much the valve is open. The symbol carrier 11 indicates by the symbol "1":¼ open, by the symbol "2":½ open, by the symbol "3":¾ open and by the symbol "4":⁴⁄₄ open. Furthermore, the symbol "0" indicates a leakage-proof position of the rotary slide valve. The symbol carrier 11 carries also an additional symbol which is illustrated by the dot 34 and indicates the start of the opening of the valve.

In FIG. 1 at the top a closure cap 35 of the valve is illustrated in two different positions. At the right side of the figure the closure cap 35 is in its operating position, i.e. it is located with a cam 36 in a detent groove of the housing such that the rotating spindle 12 (rotary slide valve) cannot be rotated. A threaded portion 37 forms a plug connection between the closure cap 35 and the rotating spindle 12. At the left side of FIG. 1 the closure cap is in an inverted position 35' and serves as handle allowing a rotating of the rotating spindle 12.

The display unit 11, 33 illustrated in FIG. 3 serves for the setting of the desired opening rate of the valve 9, 26 (FIG. 2), thus for the setting of the flow rate cross-section 10. If one desires to change the flow rate, one can decide, whether the flow rate cross-section of the valve shall be adjusted or whether the pumping pressure should be adjusted.

Because the rotating spindle is designed as rotary slide valve its rotating will not cause a changing of the height of the valve. Since also the axial movement of the position display bar is converted by the rotating bush into a rotating movement, no axial increase of the dimension of the subject of the invention occurs. Further, because all display arrangements are located on planar surface areas, lateral relative to the direction of the height of the subject of the invention, they too do not increase the total height of the subject of the invention, and furthermore, the graduations can be vastly stretched along their circular path and can give a distinct display.

The subject of the invention may be used for a controlling of the flow rate of liquids in various fields of application, such as for instance for hot-water heating plants, in the food industry, in the chemical industry and in agricultural applications.

While there is shown and described a present preferred embodiment of the invention, it is to be distinctly understood that the invention is not limited thereto, but may be otherwise variously embodied and practiced within the scope of the following claims.

We claim:

1. A flow control valve with a flow meter, including
    a housing having a conduit section;
    a transverse tube which extends perpendicularly to said conduit section;
    a rotating spindle arranged coaxially to said transverse tube and supported in said housing, which rotating spindle has a bore which is closed against the surroundings and extends through the spindle;
    a position display bar which projects into said bore and has a spring supporting area;
    a helical spring which is inserted between said spring supporting area and a spring support of the rotating spindle, which helical spring is adapted to determine an indicating position of said position display bar;
    a valve closure body part adapted to be shut in an end position by means of said rotating spindle;
    a flow receiving member located in said transverse tube and biased by said helical spring into a home position and adapted to be axially displaceable by a flow occurring in the conduit section; which rotating spindle has a transparent portion;
    a display unit including a graduation and a marker, so that a respective position of said flow receiving member displayed by the graduation and marker is readable from the outside through said transparent portion;
    which transverse tube projects radially into said conduit section and supports said rotating spindle and said valve closure body which valve closure body is adapted to directly open and close an outlet port of the transverse tube upon a rotating movement of said rotating spindle;
    which flow receiving member and which position display bar are guided in said valve closure body to be together axially displaceable;
    in which said rotating spindle is designed as a rotary slide valve of which the valve closure body comprises a control edge which is rotatable and is arranged at the transverse tube; which transverse tube has a port in its wall of which an edge forms a valve seat;
    and in which said position display bar is guided against a rotation relative to said rotating spindle and is coupled to a rotating bush in such a manner that an axial movement of said position display bar is converted into a rotary movement of said rotating bush, which rotating bush carries a part of said position display unit.

2. The flow control valve of claim 1, comprising a means for a converting of a movement, which converting means is arranged between said position display bar and said rotating bush, and which converting means includes at least one sliding bar groove and at least one sliding bar guided for a movement in said sliding bar groove, which sliding bar groove is of a helical shape.

3. The flow control valve of claim 2, comprising two sliding bar grooves located diametrically opposite of each other, and comprising two sliding bars.

4. The flow control valve of claim 1, in which said rotating bush has a planar surface area including said marker, and in which said rotary slide valve has a further planar surface area supporting the graduation of said position display unit.

5. The flow control valve of claim 4, in which said housing has a planar surface area which includes a symbol carrier, further in which said rotary slide valve includes a further, second marker cooperating with said symbol carrier, and in which the three planar surface areas of the rotating bush, the rotary slide valve and the housing extend parallel to each other.

6. The flow control valve of claim 1, in which said position display bar is guided against rotation in said rotating spindle by means of an axial key-and-slot guiding arrangement.

7. The flow control valve of claim 5, in which said symbol carrier comprises symbols for an indication of the valve being open by ¼, ½, ¾, ⁴⁄₄ and 0, which 0-position indicates a leakage-proof position of the rotary slide valve.

8. The valve of claim 7, in which said symbol carrier carries an additional symbol which indicates the begin of the opening of the valve.

* * * * *